April 4, 1961
R. I. R. DEAN
2,977,801
DIAL TYPE GAUGE INSTRUMENTS
Filed Feb. 11, 1957
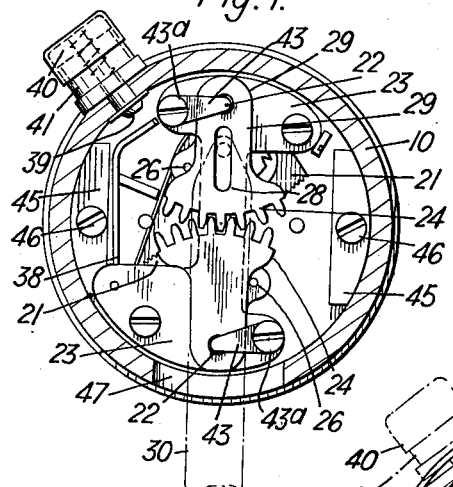
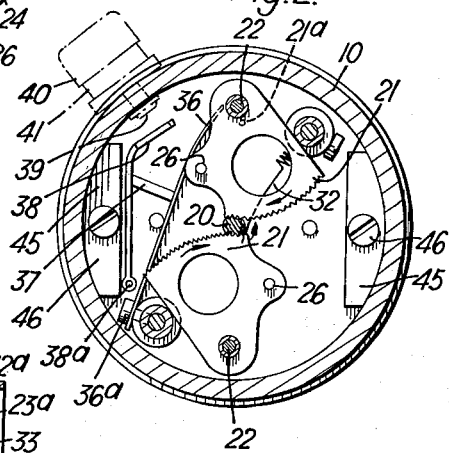
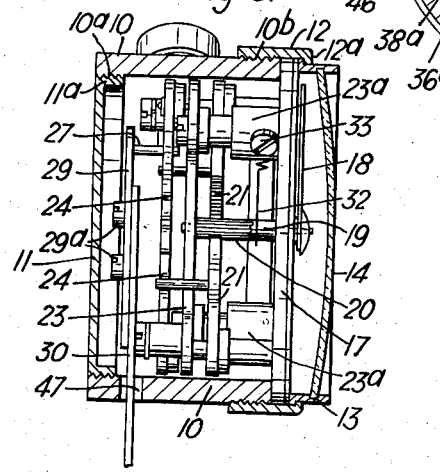
Reginald I. R. Dean
Inventor
Geo. H. Riches
By
Attorney United States Patent Office 2,977,801
Patented Apr. 4, 1961

2,977,801
DIAL TYPE GAUGE INSTRUMENTS
Reginald Ivor Reid Dean, Littleover, England
(14–16 Curzon St., Derby, England)
Filed Feb. 11, 1957, Ser. No. 639,433
6 Claims. (Cl. 73—432)

This invention relates to dial type gauge instruments such as are used for measuring or indicating torque, pressure or other phenomema.

In these instruments there is a member which is responsive to the phenomena being investigated, the member being thereby given a rotary movement or being deflected so as to actuate the pointer of the dial proportionately and so give rise to the reading which is desired.

For example the member which is responsive to the phenomena may be a torque nut, and the instrument may be a torque wrench, and they will be hereinafter described and referred to with this example in view, but it is to be understood that these terms are used with the wider applications of the invention in mind and are not intended to restrict the use of the invention.

The main object of the invention is to provide operating mechanism for such instruments by which opposite torques, reverse movements of the torque nut or the like, and negative forces generally will give rise to the same movements of the indicating pointer or the like, so that thereby the whole of the dial scale is available for the reading instead of the available length of the scale having to be divided into two parts with zero position intermediate between them.

The invention consists in providing a member responsive to the force under examination which is operatively connected with inter-engaging rotary members mounted for rotation in either direction according to the deflection of the operating member, the said rotary members being in turn associated with further rotary means which is mounted for rotary movement which is the same irrespective of the direction of movement of the first-mentioned rotary members, the further rotary means being connected with a spindle from which the movement of the indicating pointer or the like is derived.

In the preferred arrangement the indicator spindle is actuated by a pair of toothed members mounted diametrically opposite to each other on fixed pivots forming the primary operating means and moving in unison about their pivots by the deflection of the operating member.

The operating lever preferably actuates the primary operating means by a pair of secondary toothed members mounted diametrically opposite to each other and rotatable in either direction by opposite deflections of the lever, these secondary toothed members being arranged to move the primary members always in the same direction.

The mechanism may comprise a pair of secondary toothed members mounted on separate pivots and engaging directly with each other, a pair of primary toothed members also mounted on separate pivots and each engaging with the indicator spindle which is interposed between them, and abutments by which each of the primary members is moved by one of the secondary members, in response to deflection of the lever.

Means may be provided to retain the said primary racks or the like and hence the indicator spindle in the indicating position when the operating lever and secondary racks or the like are allowed to return to the zero position.

Referring to the drawings which form part of this specification:

Figure 1 is a rear elevation, partly in section, showing a mechanism for a torque wrench.

Figure 2 is a similar view to Figure 1 but with some parts removed in order to reveal those behind them.

Figure 3 is a vertical cross-section through the housing showing the mechanism in elevation.

The mechanism is mounted in a housing 10 which is of cylindrical shape and its rear end is closed by a back plate 11 provided with a flange 11ª having external screw threads co-operating with internal screw threads in the housing at 10ª. The front end of the housing is externally screw threaded at 10ᵇ and receives an internally screw threaded collar 12 provided with a flange 12ª at its outer end in which is located a ring 13 carrying a glass 14. Through the glass is visible a suitable dial or face bearing suitable graduated scale markings; these may be engraved on a dial plate 17 or printed on a sheet affixed to the said plate 17. They are traversed by an indicating pointer 18 mounted upon a central spindle 19. The spindle is fitted with or is itself toothed to act as a pinion 20. The pinion 20 is engaged by two primary toothed racks 21 which are mounted diametrically opposite each other on fixed pivot pins or arbors 22. The spindle 19 and the arbors 22 are attached to the plate 17 and have their rear ends supported in a plate 23 held by distance pieces 23ª parallel with but in spaced relation to the plate 17. The pivots or arbors 22 serve to support in a freely movable manner two secondary racks 24, one on each arbor. These secondary racks 24 are thus mounted diametrically opposite each other coaxial with the primary racks 21, but their teeth instead of engaging with the central spindle 19 engage with each other directly. These secondary racks when they move are adapted to encounter pegs 26 with their leading edges, the pegs 26 being fixed to the primary racks 21, one on each rack. The secondary racks are moved by means of a peg 27 engaging in a slot 28 in one of the secondary racks 24. This peg is attached to a plate 29 secured by screws 29ª to a main operating lever 30 which is deflected in one direction or the other by the force under inspection. In a torque wrench the opposite end of this lever would be fitted with a hexagonal or other socket to fit over a nut and the torque exerted on tightening the nut would cause the deflection of the lever in one direction, and on slackening the nut the lever would be deflected oppositely. In either event one of the secondary racks will be moved and will strike one of the pegs 26 attached to one of the primary racks 21. Thus one or other of the primary racks will be operated. Figure 1 shows the mechanism in its normal position at zero. It is immaterial in which direction the lever 30 is deflected, because the result on the secondary racks will in each case be as shown in Figure 2, the direction of the rotary movements being indicated by arrows, and the pointer spindle 19 will be rotated in the same direction by the primary racks 21. The spindle 19 has bearing on it a light coil spring brake 32 fixed by a screw 33 to one of the distance pieces 23ª. When the lever 30 is released the secondary racks 24 return to their normal positions. The primary racks and the pointer spindle are however retained in their indicating position by means of the brake 32. A leaf spring 36 is anchored to one of the distance pieces 23ª by a screw 36ª. This leaf spring is capable of being deflected by a peg 37 attached to a pivoted rocker arm 38 which is moved about a pivot 38ª set between plates 17 and 23, by means of a spring-loaded plunger 39 capable of being pushed inwardly for the purpose by means of a knob 40 working on a boss 41 on the housing. The leaf spring 36 does not make contact with any of the moving parts until the plunger 39 is operated. When the spring 36 is deflected in this way the tip of it makes contact with a pin 21ª set in one of the primary racks 21 and returns the pointer spindle to zero. The secondary racks 24 are retained in position endwise by two plates 43 attached by screws 43ª to the plate 23. The plates 43 are set in such a manner as to allow slight play to secondary rack pivots 22. The housing 10 has internally projecting lugs 45 to which the mechanism is secured by means of the screws 46 passed through the lugs 45 into the dial plate 17. The housing also has an opening 47 to allow the main operating lever 30 to emerge. Obviously this may be enclosed if desired in a suitable casing which may be attached to the housing. These details will be governed by the particular kind of instrument in which the mechanism is to be used. If desired the instrument can be made so that the dial indicating pointer returns immediately to zero, for example by providing for locking the plunger 39 in its depressed position.

Reference has been made to the inter-engaging toothed members as segmental racks, but this is not essential. They could be in the form of complete wheels if desired, although the arrangement would probably result in a less compact assembly.

I claim:

1. A mechanism for a dial type gauge instrument comprising an indicator spindle having a pinion, a pair of primary operating members mounted diametrically opposite each other on opposite sides of said pinion, a rack on the opposing faces of each member, said pinion being mounted between and engaging with both racks whereby said members are simultaneously moved in opposite directions, each primary member having a secondary operating member pivotally mounted coaxial therewith, said secondary operating members being operatively connected to each other for movement in opposite directions and operatively connected to its associated primary operating member to move said members in always the same direction, and an operating lever operatively connected with the secondary operating members to impart a corresponding movement to the secondary operating members in one of two directions, movement of said lever in either of two directions being translated into movement of the indicator spindle in one direction from zero towards maximum through the primary operating members.

2. A mechanism for a dial type gauge instrument comprising an indicator spindle having a pinion, a pair of primary operating members pivotally mounted diametrically opposite each other on opposite sides of said pinion, said members having arcuately curved racks on opposing faces engaging with said pinion for simultaneous rotation of said members in opposite directions, each primary operating member having secondary operating members pivotally mounted coaxial therewith, said secondary operating members being operatively connected to each other for simultaneous movement in opposite directions and operatively connected to its associated primary operating member to move said primary members always in the same direction, and an operating lever operatively connected with one of the secondary operating members to impart movement to the secondary operating members in one of two directions, movement of said lever in either of two directions being translated into movement of the indicator spindle in one direction from zero towards maximum through the primary operating members.

3. A mechanism according to claim 1, in which the primary toothed members and the secondary toothed members each comprise a pair of toothed segmental racks, each primary rack being co-axial with its associated secondary rack.

4. A mechanism according to claim 1, in which the primary and secondary toothed members each comprise a pair of complete toothed wheels.

5. A mechanism according to claim 1 having a releasable brake acting on the primary toothed members and the indicator spindle to retain same in indicating position when the operating lever and secondary toothed members return to the zero position.

6. A mechanism according to claim 5 in which the brake comprises a spring bearing on the primary members to hold them in indicating position, and a manually operable device for causing the return of said primary members and indicators to zero position.

References Cited in the file of this patent

UNITED STATES PATENTS

| | | |
|---|---|---|
| 2,199,553 | Zimmerman | May 7, 1940 |
| 2,608,947 | Ames | Sept. 2, 1952 |
| 2,665,658 | Welch | Jan. 12, 1954 |
| 2,722,834 | Booth | Nov. 8, 1955 |

FOREIGN PATENTS

| | | |
|---|---|---|
| 267,098 | Great Britain | Dec. 22, 1917 |